June 23, 1931.                I. R. FORSYTH                1,811,079
                                   SAW
                           Filed March 8, 1930
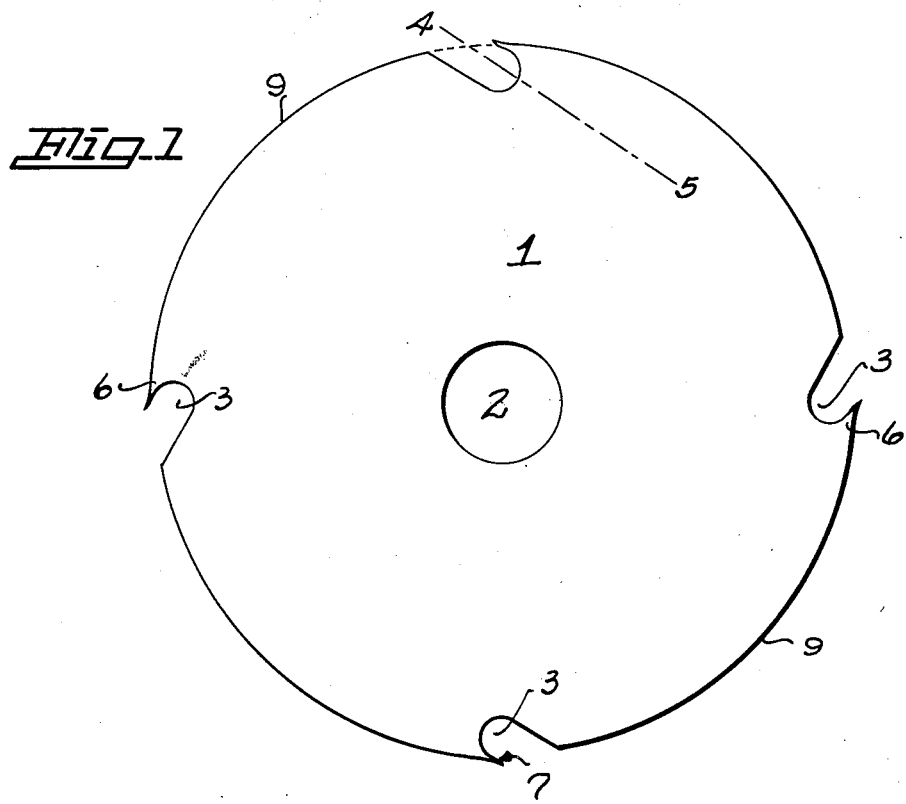
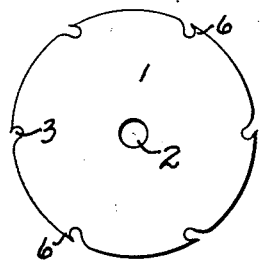 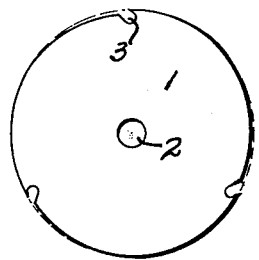 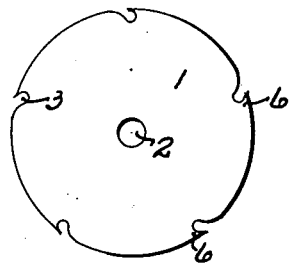
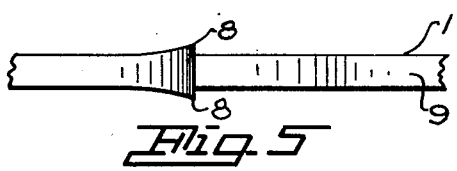
I. Roy Forsyth
Inventor
By  Herbert E. Smith
Attorney Patented June 23, 1931

1,811,079

UNITED STATES PATENT OFFICE

I. ROY FORSYTH, OF SPOKANE, WASHINGTON

SAW

Application filed March 8, 1930. Serial No. 434,266.

My present invention relates to improvements in circular saws of either the rip-saw type or of the cross-cut type, the former being illustrated herein. The primary object of the invention is to provide an efficient saw for use with either hard or soft woods, that may be operated with safety and without the dangers to life, limb, and property that now attend the operations of most circular saws with which I am familiar. As is well known to those acquainted with the operation of circular saws now in use, they are prone to "kick back" as the material or work is being cut, as for instance when a piece of wood becomes jammed or laterally clamped between the saw and its gage. It is also well known that most saws have a tendency to over-heat and expand, due to friction when the saw is revolving at high speed, and a further objectionable feature is found in the tendency of the revolving saw to "pull" the work in towards the saw, due to the shape or formation of the saw teeth. These undesirable features accompanying the operations of the circular saw frequently result in personal injury, or death, and also in property damage. In order to eliminate these objectionable features and avoid their consequences I fashion the circular saw with a circumferential periphery of uniform diameter, and space, at regular intervals in the circumference of the saw, a plurality of teeth that project beyond the periphery of the saw, which have a greater thickness than the body of the saw, and which are cut on lines that reduce or eliminate the tendency of the saw to pull in the work.

The invention consists in novel combinations and arrangements of parts of the saw for attaining the above indicated results, and in the accompanying drawings I have illustrated various modifications of the principles of my invention wherein the parts are combined and arranged according to modes I have thus far devised for the physical embodiment of my invention, and these forms of the invention have proven highly satisfactory and successful in actual use.

Figure 1 is a plan view of a circular rip saw embodying the features of my invention.

Figures 2, 3 and 4, are plan views showing respectively different numbers of teeth for the saws, as used for different purposes. Figure 5 is an enlarged, detail edge view of the saw showing one of the teeth.

The saw body 1 is of the usual circular type and provided with the center hole 2 for the saw arbor. At suitable intervals in the peripheral edge or circumferences of the saw are fashioned recesses 3 that are of uniform width and extend along the tangential line 4—5 for the purpose of receiving and discharging the saw dust as the saw revolves.

In Figure 1 four recesses 3 are shown together with a complementary number of cutting teeth 6, and it will be noted that the teeth project beyond the circular periphery or circumference of the saw for cutting or ripping purposes, and that the front edge 7 of the teeth that projects beyond the circumference of the body of the saw turns outwardly or away from the saw. Because of this out-turned front edge of the tooth, a "pull" inwardly of the work is eliminated as the teeth cut the kerf in the wood and jamming of the work is avoided.

As seen in Figure 5 the teeth are fashioned with a chisel-shape and the front cutting edge of the tooth, as at 8, 8, is thicker than the thickness of the body of the saw, tapering gradually down to the lateral faces of the saw body. The teeth thus cut a kerf that is wider than the thickness of the saw body and reduce the area of the frictional surface between the wood and the saw, consequently preventing over-heating of the saw body and consequent jamming of the saw in its work.

The projection of the teeth beyond the circumference or periphery of the saw body may vary as from one sixty-fourth to one thirty-second of an inch, for use in hard or soft woods, and the lateral projection of the teeth, as 8, may also vary in this respect, but the combined novel features in the formation of the teeth insure a clear cut kerf through which the saw may freely revolve.

The edges 9 intermediate the adjoining teeth are all of uniform diameter and form a circle with the spaced teeth as interruptions in the circle.

The number of teeth employed in a saw blade varies with the nature of the work and the speed of the saws required. Thus the saw in Figure 3 with three teeth would ordinarily be revolved at a higher speed than the saw of Figure 1 with four teeth while the saw of Figure 1 would be used at a higher speed than the five-tooth saw of Figure 6, and the latter would be used at a higher speed than the six-tooth saw of Figure 2.

Inexperienced operators are prone to overfeed the work through the saw causing a reduction of speed below the desired limit for good smooth cutting and this also sets up undue friction heating the saw, drawing the temper and burning the points of the teeth.

The saw of the present invention is self-protective, that is, the feed of material through the saw is in direct proportion to the number of teeth and the peripheral speed of the saw, each tooth has the capacity to cut only that amount of material that is represented by the projection of the tooth beyond the periphery of the blade and the peripheral edge serves to gauge or limit the feed to the exact cutting speed the saw is designed for, and in this manner protect the teeth from burning or the saw from sticking or reducing speed.

High speed operation is possible with my construction and design by a slight modification of the saw blade from that above described. For this purpose, I find it is entirely practical to maintain the true radial diameter from the tooth back to a point equidistant between the teeth or beyond and then gradually taper back as indicated in Figure 3 a slight distance so that the material may be advancing constantly between teeth, this providing a greater bite for each tooth and thereby increases the cutting speed materially where the nature of the work permits.

Having thus fully described my invention, what I claim as new and desire to secure by Letters Patent is:—

A circular saw having a circular periphery of uniform diameter, a plurality of spaced, equidistant teeth projecting beyond the periphery of the saw, said teeth having outturned front edge and projecting laterally beyond the opposite sides of the saw body, said periphery having recesses in front of the teeth and extended in uniform width along lines tangential to the center of the saw, and said saw having a gradually reduced surface area in front of each recess to reduce the diameter of the saw bounding such area.

In testimony whereof I affix my signature.

I. ROY FORSYTH.